(12) United States Patent
Ousley

(10) Patent No.: US 7,938,427 B2
(45) Date of Patent: May 10, 2011

(54) RECREATIONAL VEHICLE CHASSIS

(75) Inventor: Barry Wade Ousley, Syracuse, IN (US)

(73) Assignee: Thor Tech, Inc., Saginaw, MI (US)

( * ) Notice: Subject to any disclaimer, the term of this patent is extended or adjusted under 35 U.S.C. 154(b) by 189 days.

(21) Appl. No.: 12/277,781

(22) Filed: Nov. 25, 2008

(65) Prior Publication Data

US 2010/0127477 A1 May 27, 2010

(51) Int. Cl.
*B62D 25/20* (2006.01)
*B60P 3/335* (2006.01)

(52) U.S. Cl. ............. 280/433; 296/204; 296/184.1; 296/203.02; 296/187.08; 296/193.07; 296/168; 280/789

(58) Field of Classification Search .......... 280/433, 280/423.1, 186, 406.2, 416.2, 455.1, 414.1, 280/400, 789, 781; 296/204, 184, 181.5, 296/203.02, 187.08, 193.07, 168
See application file for complete search history.

(56) References Cited

U.S. PATENT DOCUMENTS

| | | | |
|---|---|---|---|
| 675,876 A * | 6/1901 | Anderson | 280/92 |
| 1,807,325 A * | 5/1931 | Richmond | 280/28.5 |
| 1,917,396 A * | 7/1933 | Schantz et al. | 280/424 |
| 1,924,797 A * | 8/1933 | Mitchell | 296/184.1 |
| 2,085,353 A * | 6/1937 | Culemeyer et al. | 280/400 |
| 2,127,058 A * | 8/1938 | Fitch | 414/499 |
| 2,239,089 A * | 4/1941 | Fageol | 296/203.01 |
| 2,291,626 A * | 8/1942 | Huber | 180/14.1 |
| 2,329,408 A * | 9/1943 | Minium | 280/795 |
| 2,363,170 A * | 11/1944 | Fontaine | 296/184.1 |
| 2,373,398 A * | 4/1945 | Hoobler | 280/423.1 |
| 2,466,194 A * | 4/1949 | Anderson et al. | 280/81.6 |
| 2,507,845 A * | 5/1950 | Ziegler | 280/796 |
| 2,547,269 A * | 4/1951 | Kinsey | 414/458 |
| 2,621,059 A * | 12/1952 | Ridgway | 280/795 |
| 2,667,361 A * | 1/1954 | Jones | 280/788 |
| 2,682,420 A * | 6/1954 | Chelf | 280/407 |
| 2,698,759 A * | 1/1955 | Ronning | 280/423.1 |
| 2,723,038 A * | 11/1955 | Peterson et al. | 414/531 |
| 2,754,131 A * | 7/1956 | Tulin | 280/677 |
| 2,970,004 A * | 1/1961 | Ratner et al. | 296/184.1 |
| 3,025,985 A * | 3/1962 | Crawford | 414/537 |
| 3,044,795 A * | 7/1962 | Standing et al. | 280/81.6 |
| 3,144,150 A * | 8/1964 | Cox | 280/414.1 |
| 3,399,794 A * | 9/1968 | Hummel | 414/460 |
| 3,556,558 A * | 1/1971 | McKee | 280/406.2 |
| 5,387,002 A * | 2/1995 | Grevich | 280/406.2 |
| 5,839,776 A * | 11/1998 | Clausen et al. | 296/187.03 |
| 6,003,898 A * | 12/1999 | Teply et al. | 280/785 |

(Continued)

*Primary Examiner* — Paul N Dickson
*Assistant Examiner* — Karen A Beck
(74) *Attorney, Agent, or Firm* — Dinsmore & Shohl LLP

(57) ABSTRACT

A fifth wheel trailer of the type designed to be towed with a towing vehicle having a vehicle hitch assembly includes a trailer body having an elevated front portion, and a mounting arrangement extending downward from beneath the front portion. The front portion of the trailer body has a generally convex forward surface. The trailer further includes a trailer chassis supporting the trailer body. The trailer chassis includes a forward portion supporting the front portion of the trailer body. The forward portion of the trailer chassis has a pair of side frame beams that extend along the sides of the trailer chassis. The forward portion of the trailer chassis includes a curved forward edge beam that is joined to the forward ends of the pair of side frame beams. The curved forward edge beam generally matches the curve of the front portion of the trailer body and provides support for the trailer body.

26 Claims, 3 Drawing Sheets

U.S. PATENT DOCUMENTS

| | | | |
|---|---|---|---|
| 6,142,496 A * | 11/2000 | Bartel | 280/124.166 |
| 6,394,533 B1 | 5/2002 | Ladell et al. | |
| 6,799,794 B2 * | 10/2004 | Mochidome et al. | 296/187.03 |
| 6,899,375 B2 * | 5/2005 | Sankrithi et al. | 296/156 |
| 7,278,650 B2 * | 10/2007 | Brady et al. | 280/441.2 |
| 7,556,310 B2 * | 7/2009 | Miki | 296/204 |
| 7,618,087 B2 * | 11/2009 | Hedderly | 296/203.02 |
| 2007/0267845 A1 | 11/2007 | Brady et al. | |
| 2009/0007948 A1 * | 1/2009 | Dempsey et al. | 135/96 |
| 2010/0051729 A1 * | 3/2010 | Schneider | 239/661 |
| 2010/0127477 A1 * | 5/2010 | Ousley | 280/433 |
| 2010/0319742 A1 * | 12/2010 | Prusmack | 135/88.13 |

\* cited by examiner

RECREATIONAL VEHICLE CHASSIS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Fifth wheel trailers have been used extensively for many years because of a number of advantages that they offer over other types of trailers. In particular, fifth wheel trailers permit somewhat heavier loads to be towed safely. Additionally, fifth wheel trailers track well behind towing vehicles, even when adverse road conditions are encountered. Finally, fifth wheel travel trailers provide a great deal of useable interior room.

Fifth wheel trailers have become popular in recent years in the travel trailer industry. A conventional fifth wheel travel trailer is specifically designed to be towed by a pick up truck or a flat bed truck. The front end of a fifth wheel travel trailer is elevated above the bed of the truck. The fifth wheel travel trailer includes a mounting portion, sometimes referred to as a kingpin that extends downward from beneath the elevated front end of the trailer and engages a trailer hitch that is secured to the bed of the pick up truck. Preferably, the hitch is positioned directly above the rear wheels of the truck. This fifth wheel hitch arrangement has the advantage that a significant portion of the weight of the trailer is applied to the truck bed over the truck's rear wheels, increasing the traction that can be obtained by the truck. This, in turn, produces a towing combination of truck and trailer which handles well during towing, minimizing sway, and which backs up with relative ease. Further, the two level design of the trailer results in an elevated forward portion of the trailer that can be used advantageously as a bedroom area.

Fifth wheel trailers, however, are not without some disadvantages. Some fifth wheel trailers have designs that reduce the turning radius of the towed trailer. Typically, the turning radius is restricted to avoid contact between the forward, elevated portion of the trailer and the passenger cab of the truck. This situation is exacerbated with a short bed truck in which the vehicle hitch assembly is positioned closer to the truck cab than the case with a truck having a bed of standard length. To improve the turning radius, some fifth wheel trailers now have curved or angled surface contours at the front of the trailer bodies. Such a trailer body contour results in a truck/trailer combination in which sharply turning the truck with the trailer in tow does not produce contact between the truck and the trailer. This curved front portion of the fifth wheel trailer, however, requires that an appropriate chassis design be used, in some instances complicating chassis construction.

DETAILED DESCRIPTION OF THE PREFERRED EMBODIMENTS

Figure 1:
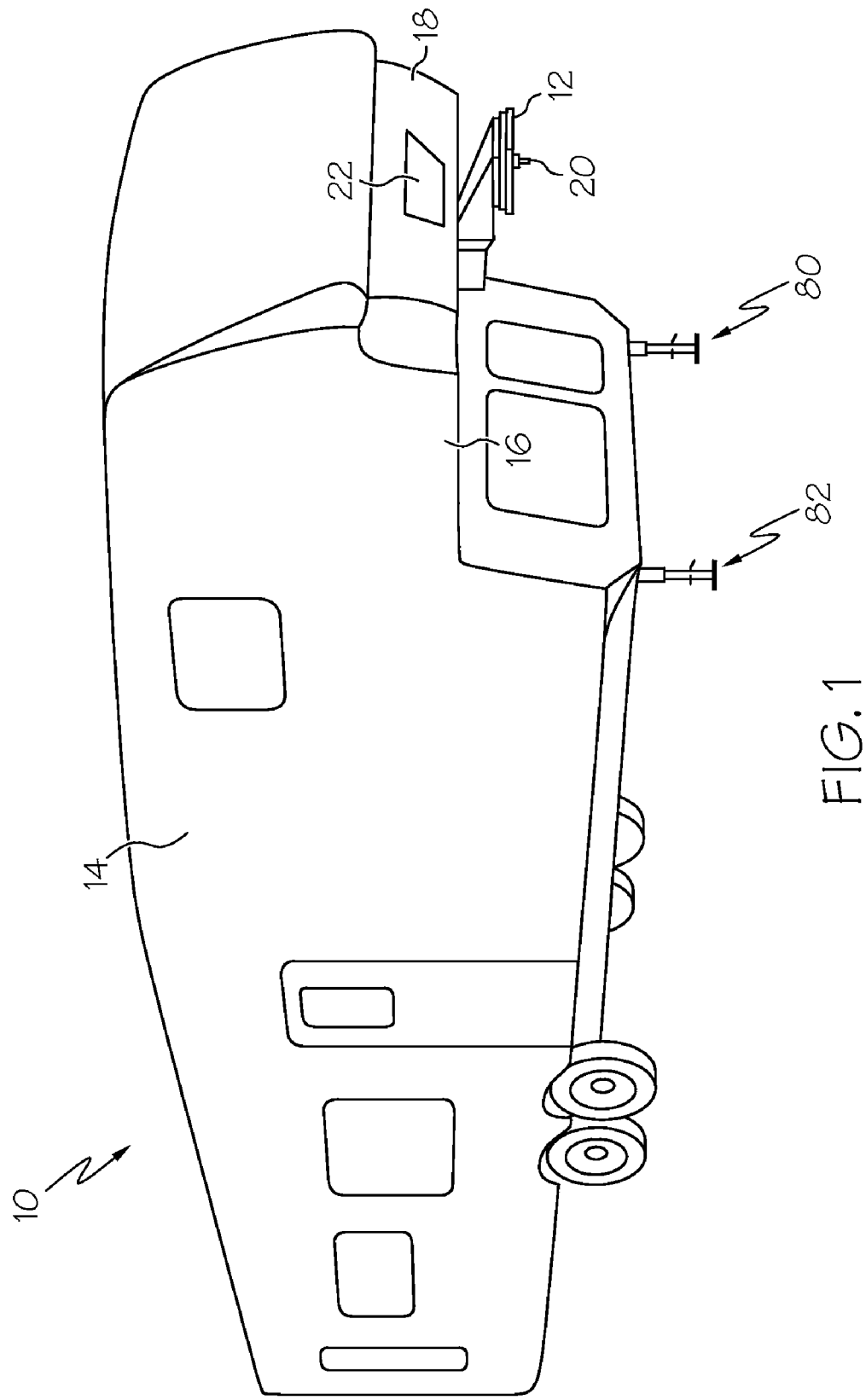
FIG. 1 is a perspective view of a fifth wheel trailer.

FIG. 1 illustrates a fifth wheel trailer 10 of the type designed to be towed with a towing vehicle (not shown). The towing vehicle, such as for example a pick up truck, has a vehicle hitch assembly that engages vehicle mounting arrangement 12 extending downward from the trailer 10. The fifth wheel trailer has a trailer body 14 with an elevated front portion 16. The front portion 16 defines a generally convex, curved forward surface 18. The towing vehicle typically may comprise a pick up truck, a flat bed truck, or another suitable type of truck. The mounting arrangement 12 includes a fifth wheel pin box 20 extending downward from beneath the front portion 16. A vehicle that is used to tow the trailer will have a hitch assembly mounted on the bed of the truck above, and between, the rear wheels of the truck. When the mounting arrangement 12 is secured to the hitch assembly, the truck will support a significant portion of the weight of the trailer 10. This enhances the traction achieved with the rear wheels of the truck, and produces a truck and trailer combination that handles and performs well.

The trailer body 14 has a front end cap 18 which is made of molded polymer material or fabricated from aluminum or other metal material. The front end cap surface is contoured and includes a reflector 22 that is integral with the front portion of the trailer body 14. Reflector 22 faces forward and downward such that the driver of a towing vehicle can view the reflection of the vehicle hitch assembly and the mounting arrangement 12 extending from the trailer body, as the towing vehicle is backed up.

The trailer 10 further includes a trailer chassis supporting the trailer body 14. The trailer chassis includes a forward portion 24 (FIG. 2) that supports the front portion 16 of the trailer body 14. The forward portion 24 of the trailer chassis has a pair of side frame beams 26 and 28 that extend along the sides of the trailer chassis. The forward portion 24 also has a curved forward edge beam 30 that is joined to the forward ends of the pair of side frame beams 26 and 28. The curved forward edge beam 30 generally matches the curve of the front portion of the trailer body 16 and provides support for the front portion of the trailer body 16 across its entire width. The trailer chassis further comprises a first cross beam 32 extending between and attached to the pair of side frame beams 26 and 28. The first cross beam 32 is rearward of the curved forward edge beam 30.

The vehicle mounting arrangement 12 is secured to and extends downward from the chassis for engagement by the vehicle hitch assembly. The chassis further comprises a pair of longitudinal beams 34 and 36 that are positioned parallel to, and between, the pair of side frame beams 26 and 28, and that are secured to the curved forward edge beam 30 and to the first cross beam 32. The vehicle mounting arrangement 12 is attached to the pair of longitudinal beams 34 and 36. The chassis further comprises a plurality of additional cross beams 38 and 40, extending between and attached to the pair of side frame beams 26 and 28. The plurality of additional cross beams 38 and 40 are rearward of the first cross beam 32.

The trailer chassis may further comprise a plurality of additional longitudinal beams 42, 44, 46, and 48 extending parallel to, and between, the pair of side frame beams 26 and 28, and secured to the first cross beam 32 and the plurality of additional cross beams 38 and 40. The trailer chassis may further comprise a forward pair of bracing beams 50 and 52, that run parallel to, and between, the pair of side frame beams 26 and 28. Bracing beams 50 and 52 are secured to the curved forward edge beam 30 and to the first cross beam 32. The forward pair of bracing beams 50 and 52 is positioned between the side frame beams 26 and 28, and the pair of longitudinal beams 34 and 36.

Figure 2:
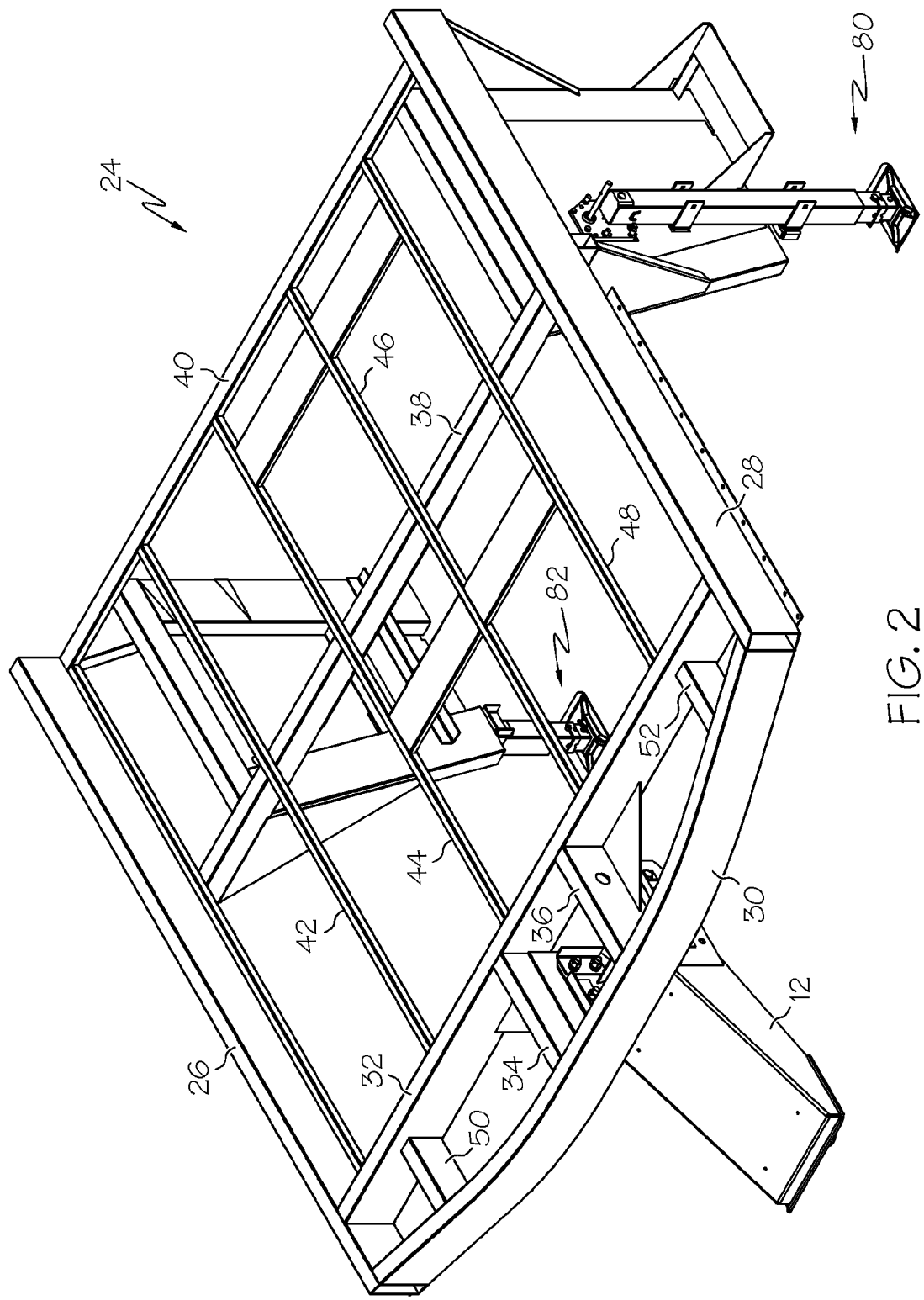
FIG. 2 is perspective view of a forward portion of one embodiment of the trailer chassis.
Figure 3:
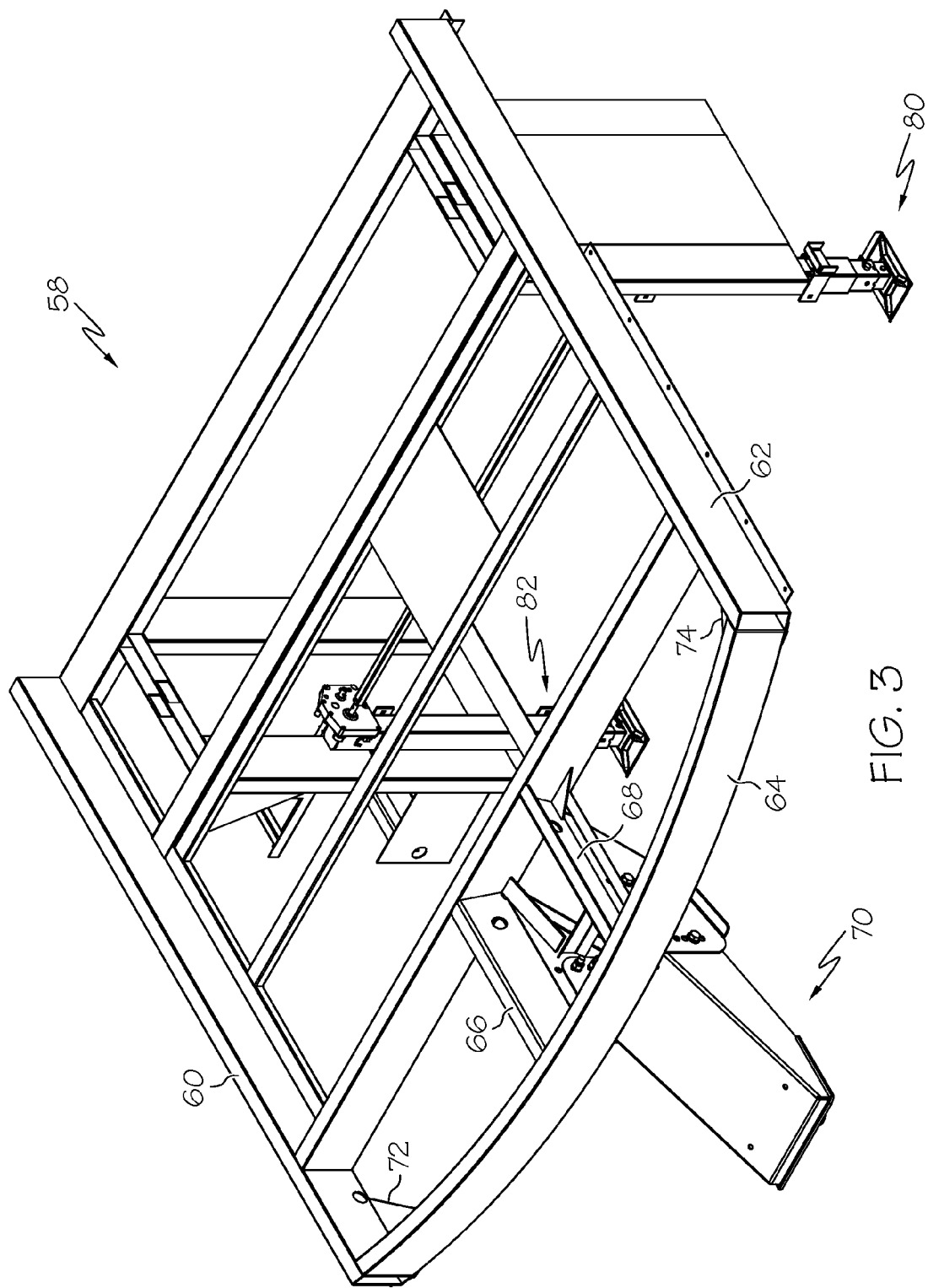
FIG. 3 is a perspective view of a forward portion of a second embodiment of the trailer chassis.

FIG. 3 shows a second embodiment of the forward chassis portion 58. The forward portion 58 of the trailer chassis has a pair of side frame beams 60 and 62 extending along the sides of the trailer chassis, and a curved forward edge beam 64 joined to the forward ends of the pair of side frame beams 60 and 62. The trailer chassis further includes a first cross beam 66 extending between and attached to the pair of side frame beams 60 and 62, and a pair of longitudinal beams 66 and 68, extending parallel to, and between, the pair of side frame beams 60 and 62. The vehicle mounting arrangement 70 is attached to the pair of longitudinal beams 66 and 68. It will be noted that the embodiment of FIG. 3 does not include a number of the beams that are found in the embodiment of FIG. 2. For example, the embodiment of FIG. 3 does not include additional longitudinal beams that extend parallel to, and between, the pair of side frame beams and that are secured to the first cross beam and the plurality of additional cross beams. Further, the trailer chassis does not include a forward pair of bracing beams extending parallel to, and between, the pair of side frame beams and secured to the curved forward edge beam and the first cross beam. The simplified construction of FIG. 3 may be used with fifth wheels that require less rigid frame constructions. The embodiment of FIG. 3 may include additional bracing, however. The chassis, for example, may include a pair of support gusset plates 72 and 74 secured between respective ones of the pair of side frame beams 60 and 62, and the curved forward edge beam 64 at the forward ends of the pair of side frame beams 60 and 62, respectively.

It will be apparent that both embodiments of the chassis include such additional plates and braces as may be needed to provide additional support for various trailer components in the trailer. Further, both embodiments include support components 80 and 82 which are secured to chassis beams, and which support the fifth wheel trailer when it is not hitched to a pick up truck, as illustrated in FIG. 1.

It will be appreciated that the construction exemplified by the embodiments of FIGS. 2 and 3 provide solid support for the curved forward end of the travel trailer body while at the same time offering a simply constructed support chassis. The chassis of FIGS. 2 and 3 require a minimum number of separate beams and braces, while offering a stable base for the fifth wheel body.

While certain representative embodiments and details have been shown for purposes of illustrating the invention, it will be apparent to those skilled in the art that various changes in the invention disclosed herein may be made without departing from the scope of the invention, which is defined in the appended claims.

What is claimed is:

1. A fifth wheel trailer of the type designed to be towed with a towing vehicle, said towing vehicle having a vehicle hitch assembly, comprising:
   a trailer body having an elevated front portion, with a mounting arrangement extending downward from beneath said front portion, said front portion having a generally convex forward surface, and
   a trailer chassis supporting said trailer body, said trailer chassis including a forward portion supporting said front portion of said trailer body, said forward portion of said trailer chassis having pair of side frame beams extending along the sides of said trailer chassis, and a curved forward edge beam joined to the forward ends of said pair of side frame beams, said curved forward edge beam generally matching the curve of said front portion of said trailer body to provide support therefore.

2. The fifth wheel trailer of claim 1 in which said trailer chassis further comprises a first cross beam extending between and attached to said pair of side frame beams, said first cross beam being rearward of said curved forward edge beam.

3. The fifth wheel trailer of claim 2, further comprising a vehicle mounting arrangement extending downward from said chassis for engagement by said vehicle hitch assembly.

4. The fifth wheel trailer of claim 3 in which said chassis further comprises a pair of longitudinal beams extending parallel to, and between, said pair of side frame beams and secured to said curved forward edge beam and said first cross beam.

5. The fifth wheel trailer of claim 4 in which said vehicle mounting arrangement is attached to said pair of longitudinal beams.

6. The fifth wheel trailer of claim 2 in which said trailer chassis further comprises a plurality of additional cross beams extending between and attached to said pair of side frame beams, said plurality of additional cross beams being rearward of said first cross beam.

7. The fifth wheel trailer of claim 6 in which said trailer chassis further comprises a plurality of additional longitudinal beams extending parallel to, and between, said pair of side frame beams and secured to said first cross beam and said plurality of additional cross beams.

8. The fifth wheel trailer of claim 4 in which said trailer chassis further comprises a forward pair of bracing beams extending parallel to, and between, said pair of side frame beams and secured to said curved forward edge beam and said first cross beam, said forward pair of bracing beams being positioned between said side frame beams and said pair of longitudinal beams.

9. The fifth wheel trailer of claim 1, in which said chassis further includes a pair of support gusset plates secured between respective ones of said pair of side frame beams and said curved forward edge beam at the forward ends of said pair of side frame beams.

10. A trailer, comprising:
    a trailer body having a front portion, said front portion having a generally convex forward surface, and
    a trailer chassis supporting said trailer body, said trailer chassis including a forward portion supporting said front portion of said trailer body, said forward portion of said trailer chassis having pair of side frame beams extending along the sides of said trailer chassis, and a curved forward edge beam joined to the forward ends of said pair of side frame beams, said curved forward edge beam generally matching the curve of said front portion of said trailer body to provide support therefore.

11. The trailer of claim 10, in which said trailer chassis further comprises a first cross beam extending between and attached to said pair of side frame beams, said first cross beam being rearward of said curved forward edge beam.

12. The trailer of claim 11, in which said chassis further comprises a pair of longitudinal beams extending parallel to, and between, said pair of side frame beams and secured to said curved forward edge beam and said first cross beam.

13. The trailer of claim 12 further comprising a vehicle mounting arrangement attached to said pair of longitudinal beams.

14. The trailer of claim 11 in which said trailer chassis further comprises a plurality of additional cross beams extending between and attached to said pair of side frame beams, said plurality of additional cross beams being rearward of said first cross beam.

15. The trailer of claim 14 in which said trailer chassis further comprises a plurality of additional longitudinal beams extending parallel to, and between, said pair of side frame beams and secured to said first cross beam and said plurality of additional cross beams.

16. The trailer of claim 15 in which said trailer chassis further comprises a forward pair of bracing beams extending parallel to, and between, said pair of side frame beams and secured to said curved forward edge beam and said first cross beam, said forward pair of bracing beams being positioned between said side frame beams and said pair of longitudinal beams.

17. The trailer of claim 10, in which said chassis further includes a pair of support gusset plates secured between respective ones of said pair of side frame beams and said curved forward edge beam at the forward ends of said pair of side frame beams.

18. A trailer chassis for supporting the trailer body of a fifth wheel trailer having an elevated front portion defining a generally convex forward surface, comprising a forward chassis portion supporting said front portion of said trailer body, said forward portion of said trailer chassis having pair of side frame beams extending along the sides of said trailer chassis, and a curved forward edge beam joined to the forward ends of said pair of side frame beams, said curved forward edge beam generally matching the curve of said front portion of said trailer body to provide support therefore.

19. The trailer chassis of claim 18 further comprising a first cross beam extending between and attached to said pair of side frame beams, said first cross beam being rearward of said curved forward edge beam.

20. The trailer chassis of claim 19, further comprising a vehicle mounting arrangement extending downward from said chassis for engagement by a vehicle hitch assembly.

21. The trailer chassis of claim 20 further comprising a pair of longitudinal beams extending parallel to, and between, said pair of side frame beams and secured to said curved forward edge beam and said first cross beam.

22. The trailer chassis of claim 21 in which said vehicle mounting arrangement is attached to said pair of longitudinal beams.

23. The trailer chassis of claim 19 further comprising a plurality of additional cross beams extending between and attached to said pair of side frame beams, said plurality of additional cross beams being rearward of said first cross beam.

24. The trailer chassis of claim 23 further comprising a plurality of additional longitudinal beams extending parallel to, and between, said pair of side frame beams and secured to said first cross beam and said plurality of additional cross beams.

25. The trailer chassis of claim 21 further comprising a forward pair of bracing beams extending parallel to, and between, said pair of side frame beams and secured to said curved forward edge beam and said first cross beam, said forward pair of bracing beams being positioned between said side frame beams and said pair of longitudinal beams.

26. The trailer chassis of claim 18, further including a pair of support gusset plates secured between respective ones of said pair of side frame beams and said curved forward edge beam at the forward ends of said pair of side frame beams.

* * * * *